US012735039B2

(12) United States Patent
King et al.

(10) Patent No.: US 12,735,039 B2
(45) Date of Patent: Sep. 15, 2026

(54) METHOD FOR CONTROLLING A DRIVE TRAIN AND DRIVE TRAIN

(71) Applicant: ZF Friedrichshafen AG, Friedrichshafen (DE)

(72) Inventors: Tobias King, Markdorf (DE); Christian Mittelberger, Ravensburg (DE); Michael Grossmann, Horgenzell (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 19/277,691

(22) Filed: Jul. 23, 2025

(65) Prior Publication Data

US 2026/0028026 A1 Jan. 29, 2026

(30) Foreign Application Priority Data

Jul. 25, 2024 (DE) ..................... 10 2024 207 001.7

(51) Int. Cl.

*B60W 30/18* (2012.01)
*B60L 15/20* (2006.01)
*B60W 10/02* (2006.01)
*B60W 10/11* (2012.01)
*B60W 10/18* (2012.01)

(52) U.S. Cl.

CPC ... *B60W 30/18109* (2013.01); *B60L 15/2009* (2013.01); *B60W 10/02* (2013.01); *B60W 10/11* (2013.01); *B60W 10/18* (2013.01); *B60W 2510/182* (2013.01); *B60W 2540/12* (2013.01);

(Continued)

(58) Field of Classification Search

CPC ...... B60W 10/02; B60W 10/11; B60W 10/18; B60W 30/18109; B60W 2510/182; B60W 2540/12; B60W 2710/021; B60W 2710/1005; B60W 2710/182; B60L 15/2009

See application file for complete search history.

(56) References Cited

U.S. PATENT DOCUMENTS 5,826,954 A * 10/1998 Schmitt ................ B60T 8/4872
303/113.5
7,024,290 B2 4/2006 Zhao et al.

(Continued)

FOREIGN PATENT DOCUMENTS

DE 10 2020 111 402 10/2021

OTHER PUBLICATIONS

German Patent Office, Search Report issued in German Patent application No. 10 2024 207 001.7 (Apr. 1, 2025).

*Primary Examiner* — Edwin A Young

(74) *Attorney, Agent, or Firm* — Secant IP, P.L.L.C.

(57) ABSTRACT

A method is provided for controlling a drive train (12) of a motor vehicle (10) having an electric drive motor (16, 17), a wheel (26, 27) driven by the electric drive motor (16), and an anti-lock braking system (30) for preventing the wheel from locking (26, 27). The method includes detecting an impending control intervention of the anti-lock braking system (30) and disconnecting a torque-transmitting connection from the electric drive motor (16) to the wheel (26, 27) when an impending control intervention of the anti-lock braking system (30) is detected. Also disclosed are a control device (60), a drive train (12), and a motor vehicle (10) configured to carry out such a method.

11 Claims, 3 Drawing Sheets

(52) U.S. Cl.
CPC ................. *B60W 2710/021* (2013.01); *B60W 2710/1005* (2013.01); *B60W 2710/182* (2013.01)

(56) References Cited

U.S. PATENT DOCUMENTS

| | | | | |
|---|---|---|---|---|
| 7,349,788 | B2 | 3/2008 | Tohler et al. | |
| 2003/0054910 | A1* | 3/2003 | Nett | B60K 6/48 903/910 |
| 2014/0097061 | A1* | 4/2014 | Borntraeger | F16D 23/12 192/99 S |
| 2016/0040734 | A1* | 2/2016 | Tamai | B60W 30/02 903/946 |
| 2018/0162355 | A1* | 6/2018 | Colavincenzo | B60L 50/30 |

* cited by examiner

METHOD FOR CONTROLLING A DRIVE TRAIN AND DRIVE TRAIN

RELATED APPLICATIONS

This application claims the benefit of and right of priority under 35 U.S.C. § 119 to German Patent Application no. 10 2024 207 001.7, filed on 25 Jul. 2024, the contents of which are incorporated herein by reference in its entirety

FIELD OF THE DISCLOSURE

The invention relates to a method for controlling a drivetrain in a motor vehicle as disclosed herein. The invention also relates to a control device, a drivetrain, a motor vehicle, a computer program, and a computer-readable medium according to the present disclosure.

BACKGROUND

The state of the art includes drivetrains for motor vehicles that feature an electric drive motor which drives the motor vehicle. The drivetrain also comprises one or more wheels via which the drive torque of the electric drive motor is transmitted to a road surface. Furthermore, drivetrains are known in which the driven wheel and, if applicable, other non-driven wheels are prevented from locking by means of an anti-lock braking system in order to maintain the steerability of the motor vehicle even during emergency braking and/or to reduce the braking distance of the motor vehicle.

In motor vehicles with such a drivetrain with at least one electric drive motor, there is a need for a high transmission ratio which allows the electric drive motor to rotate significantly faster, i.e., at a significantly higher rotational speed than the wheels. One disadvantage of a high transmission ratio is that the inertia of the electric drive motor, which is transmitted to the driven wheel or wheels, is increased.

During normal braking, it is desirable to couple the electric drive motor to the driven wheel in order to recover at least part of the kinetic energy of the motor vehicle as electrical energy via the electric drive motor, which acts as a generator during such braking, and to feed it back to an energy storage device, in particular a high-voltage battery of a motor vehicle.

In the event of emergency braking, where there is a risk of a wheel of the motor vehicle locking up, in particular a driven wheel, a control intervention of the anti-lock braking system, takes place to maintain the steerability of the motor vehicle, improve driving stability, and/or shorten the braking distance.

During such emergency braking, rapid turning of the wheels in combination with the high transmitted inertia of the electric drive motor can cause vibrations and shocks in the drivetrain, which reduce driving comfort and lead to increased mechanical stress in the drivetrain.

DE 10 2005 033 354 A1 discloses a method for damping vibrations in the drivetrain of a motor vehicle driven by an electric drive motor, which has an anti-lock braking system. An electric drive motor control unit controls a torque output signal from the electric drive motor in order to dampen drivetrain vibrations during braking when the anti-lock braking system is actively engaged. A proportional controller, a proportional-differential controller, or a differential controller can be used to generate the torque output signal based on at least one of the variables motor rotational speed, average of the drive wheel rotational speeds, difference between the two rotational speeds, motor angular acceleration, average wheel angular acceleration, and difference between the angular accelerations. The motor rotational speed signals and the average drive rotational speed signals can be filtered to eliminate high-frequency components from each rotational speed signal. In addition, the amplitude of the torque output signal can be limited between a positive upper limit value and a negative lower limit value of the active motor damping.

SUMMARY

The objective of the invention is to provide a simple and reliable method for preventing vibrations in a drivetrain of a motor vehicle having an electric drive motor and an anti-lock braking system, and to overcome or at least mitigate the disadvantages known from the prior art.

The task is solved by a method for controlling a drivetrain of a motor vehicle with an electric drive motor, a wheel driven by the electric drive motor, and an anti-lock braking system for preventing the wheel from locking. The method comprises the following steps:

- detecting the impending control intervention of the anti-lock braking system,
- disconnecting a torque-transmitting connection from the electric drive motor to the wheel when an impending control intervention of the anti-lock braking system is detected.

A motor vehicle can, in principle, be any means of transport on land, such as cars, trucks, buses, autonomous passenger or freight transporters, emergency vehicles, work vehicles (e.g., forklifts), construction vehicles such as concrete mixers, excavators or similar, but also motorized two-wheelers such as motorcycles or electrically powered bicycles. Furthermore, motor vehicles include means of transport such as helicopters or aircraft that can cover at least part of their route on land and are equipped with driven wheels for movement on land.

In this context, a drivetrain is understood to be a unit that enables the motor vehicle to move independently of external forces acting on the motor vehicle, in particular independently of gravity. Such a drivetrain comprises one or more electric drive motors and a brake system with an anti-lock braking system, which is designed to prevent at least one wheel of the motor vehicle that is in operative connection with a drive motor from locking and to regulate the brake pressure at this wheel.

In this context, an electric drive motor is a motor that converts electrical energy into kinetic energy and thus propels the motor vehicle. The electric drive motor may be of the synchronous motor or asynchronous motor type in particular. Furthermore, the electric drive motor can be designed as a brush motor or as a brushless electric drive motor.

In this context, an anti-lock braking system is a system designed to detect when a wheel is locking up and reduce the brake pressure on that wheel so that it starts turning again, thereby maintaining the steerability of the vehicle, especially in the case of a steered wheel, and enabling the driver to perform a safe evasive maneuver.

In this context, a control intervention of an anti-lock braking system refers to a situation in which the brake pressure on at least one wheel is so high that an unchanged brake pressure would cause the wheel to lock, and the brake pressure is reduced accordingly until the wheel starts turning again.

Wheel lockup refers to a situation in which a wheel no longer rolls over its circumference but is fixed by a brake in such a way that the wheel slides over a contact surface with the ground without turning.

In this context, a torque-transmitting connection refers in particular to a drive shaft, a drive belt, a drive chain or similar, which transmit the drive torque of the electric drive motor to a driven wheel of the motor vehicle.

The method according to the invention makes it possible to significantly improve the controllability of the anti-lock braking system in a drivetrain with an electric drive motor, since the wheels are decoupled from the inertia of the electric drive motor and any gearbox located between the electric drive motor and the driven wheel.

Furthermore, vibrations in the drivetrain can be prevented, as feedback from the wheel to the electric drive motor is avoided.

In a preferred embodiment of the method, it is provided that the impending control intervention of the anti-lock braking system is detected by a position of a brake actuating element. In this context, a brake actuating element refers in particular to a brake pedal or brake lever which converts the driver's desire to brake into brake pressure at one of the wheel brakes of the motor vehicle.

During emergency braking, which typically involves the intervention of the anti-lock braking system, it is typical for the brake actuating element to be fully or almost fully activated. From this position of the brake actuating element, an impending control intervention of the anti-lock braking system can be reliably derived.

Alternatively, or additionally, it is advantageous to provide that the impending control intervention of the anti-lock braking system is detected by a speed of change in the position of the brake actuating element. Another characteristic feature of an impending control intervention of an anti-lock braking system is that the position of the brake actuating element changes abruptly during an impending control intervention of an anti-lock braking system, in particular as a result of reflexive heavy braking or jerking of the brake lever.

By detecting the position or the rate of change of the position of the brake actuating element, the method can be initiated before the control intervention of the anti-lock braking system actually takes place. This provides additional time to disconnect the torque-transmitting connection between the electric drive motor and the driven wheel.

In a further advantageous embodiment of the method, it is provided that an impending control intervention by the anti-lock braking system is detected by a speed at which brake pressure is built up and/or when a threshold value for the brake pressure is exceeded. In this way, too, an impending control intervention of the anti-lock braking system can be reliably detected and the torque-transmitting connection disconnected in good time to enable improved controllability of the wheels during emergency braking.

In an advantageous embodiment of the method, it is provided that the torque-transmitting connection is disconnected by shifting a gearbox located in the drivetrain between the electric drive motor and the driven wheel to a neutral position. Shifting a gearbox from a first, torque-transmitting shift position to a second, torque-free neutral position is a reliable and quick way to disconnect the torque-transmitting connection.

It is preferable to delay the build-up of brake pressure on a driven axle of the drivetrain until the gearbox is shifted into neutral position in order to prevent the gearbox components and/or the drivetrain from becoming jammed. This prevents malfunctions, particularly when shifting the gearbox into neutral position to disconnect the torque-transmitting connection.

In a drivetrain of a motor vehicle with several driven axles, it is particularly advantageous if each of the driven axles is connected to a gearbox with an electric drive motor in a torque-transmitting manner, wherein the delay in the build-up of brake pressure at the axles occurs sequentially. The delayed brake pressure build-up allows the gearbox on the respective axle to be shifted into neutral position while maximum brake pressure is applied to the other axles and the braking maneuver is initiated. This can shorten the braking distance as only one axle is operated with reduced brake pressure for a short time.

Alternatively, or additionally, it is advantageous to provide for the torque-transmitting connection to be disconnected by opening a clutch arranged in the drivetrain between the electric drive motor and the driven wheel.

Another aspect of the invention relates to a control device for controlling a drivetrain in a motor vehicle, wherein the control device is operatively connected to an anti-lock braking system and a torque-transmitting connection of the drivetrain. The control unit is designed to carry out a method described in the preceding paragraphs, in particular when a machine-readable computer program code is executed by the control unit.

Another aspect of the invention relates to a drivetrain for a motor vehicle with an electric drive motor, a driven wheel, and a torque-transmitting connection between the electric drive motor and the driven wheel. The drivetrain also includes a control unit described in the previous section for controlling the anti-lock braking system and the torque-transmitting connection.

In a preferred embodiment of the drivetrain, the brake system is a pneumatically operated brake system. In pneumatically operated brake systems, brake pressure is usually built up with a slight time delay compared to hydraulic brake systems, making pneumatically activated brake systems particularly suitable for the proposed method.

Another aspect of the invention relates to a motor vehicle with such a drivetrain.

In an advantageous configuration of the motor vehicle, it is provided that the motor vehicle has several driven axles. Preferably, each of these axles is driven by an electric drive motor, each of the electric drive motors being connected to the respective drive axle via a gearbox. The motor vehicle is in particular a commercial vehicle, preferably a truck or a bus. In such a motor vehicle, the inertia is usually particularly high, so that the improved controllability achieved by disconnecting the wheel from the electric drive motor is particularly advantageous.

Another aspect of the invention relates to a computer program comprising instructions that, when executed by a computer, cause the computer to perform one of the aforementioned methods. The computer program can also be referred to as a computer program product.

Another aspect of the invention relates to a computer-readable medium that has computer program code for carrying out a method described in the preceding sections for operating a drivetrain in a motor vehicle. The term "computer-readable medium" refers in particular, but not exclusively, to hard disks and/or servers and/or memory sticks and/or flash memory and/or DVDs and/or Bluerays and/or CDs. In addition, the term "computer-readable medium" also refers to a data stream, such as that which is created when a computer program and/or a computer program product is downloaded from the Internet.

BRIEF DESCRIPTION OF THE DRAWINGS

The invention is briefly explained below with reference to drawings. The following is shown in the figures.

DETAILED DESCRIPTION

Figure 1:
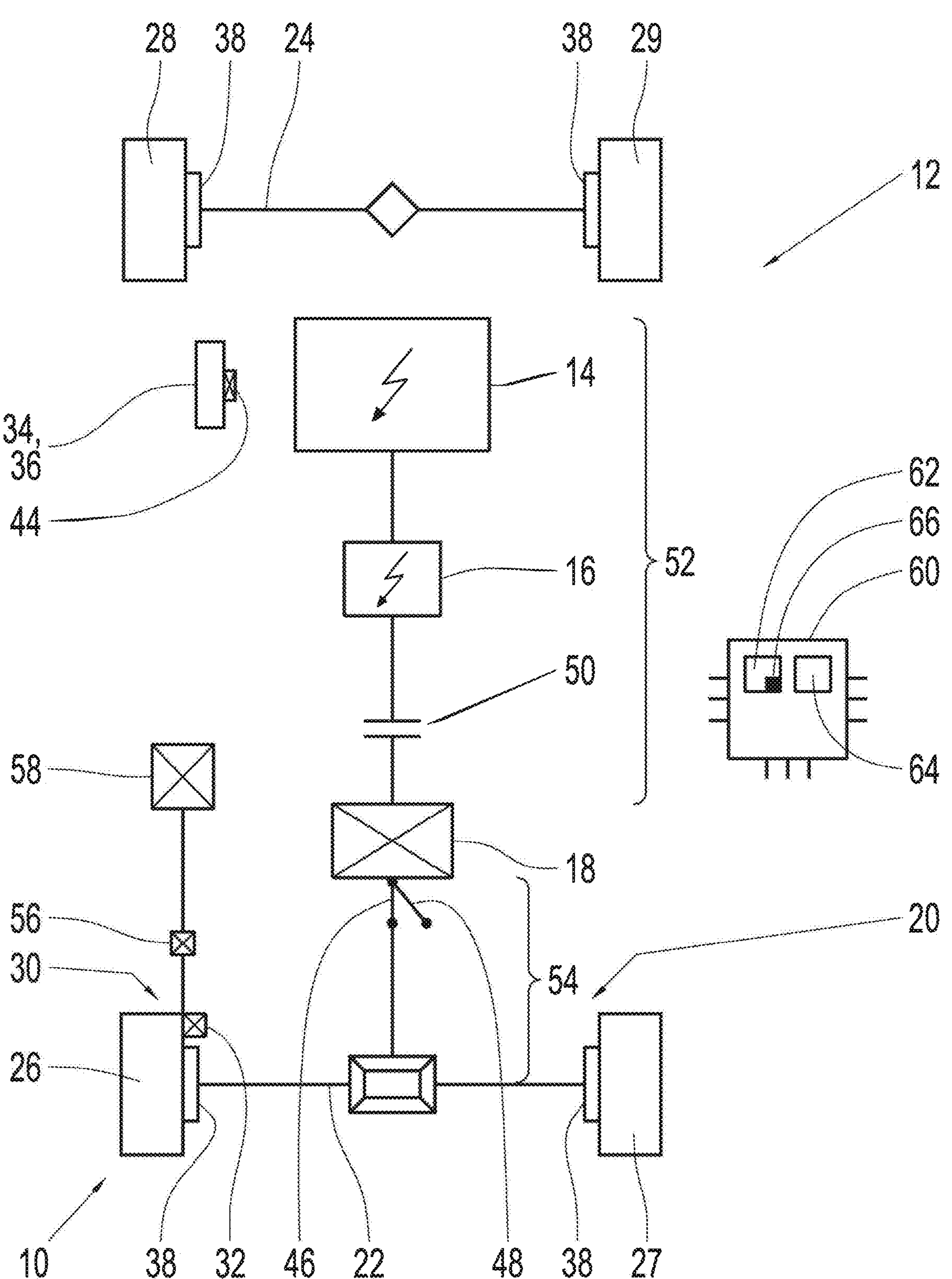
FIG. 1: a schematic view of a preferred exemplary embodiment of a drivetrain for a motor vehicle, which is controlled by a method according to the invention for controlling the drivetrain during emergency braking of the motor vehicle.

FIG. 1 shows a schematic view of a drivetrain 12 for a motor vehicle 10. The drivetrain 12 comprises a power supply unit 14, an electric drive motor 16 connected to the power supply unit 14, and a brake system 20. The drivetrain 12 comprises a first, driven axle 22 and a second, preferably non-driven axle 24. The drivetrain 12 further comprises a gearbox 18, which is arranged between the electric drive motor 16 and a driven axle 22. A first driven wheel 26 and a second driven wheel 27 are provided on the driven first axle 22, which are connected to the gearbox 18 via a differential 42, so that an output torque of the gearbox 18 is transmitted to the driven wheels 26, 27 via the differential 42.

In a first shift position 46, the gearbox 18 is connected to a differential 42 on the drive axle 22 in a torque-transmitting manner. The gearbox 18 has a second shift position 48 in which torque transmission from the gearbox 18 to the wheels 26, 27 is interrupted. This second shift position 48 is also referred to as the neutral position. Alternatively, or additionally, the drivetrain 12 may also have a clutch 50 which can disconnect or connect a torque-transmitting connection between the electric drive motor 16 and the wheels 26, 27.

The drivetrain 12 can be divided into a first drivetrain component 52 and a second drivetrain component 54. The first drivetrain component 52 comprises the electric drive motor 16, while the second drivetrain component 54 comprises the driven wheels 26, 27. Between the first drivetrain component 52 and the second drivetrain component 54, an element 18, 50 is provided for disconnecting a torque-transmitting connection between the electric drive motor 16 and the wheels 26, 27.

The drivetrain 12 also comprises a brake system 20, which includes an anti-lock braking system 30, a rotational speed sensor 32 for detecting the rotational speed of one of the wheels 26, 27, 28, 29, a brake actuator 34, in particular a brake pedal 36 or a brake lever, and a wheel brake 38. A brake actuator sensor 44, in particular a brake pedal sensor, is provided on the brake actuator element 34 in order to detect a position of the brake actuating element 34 and/or a change in the position of the brake actuating element 34. The brake system 20 may also include a compressed air reservoir 58 for pneumatic activation of one of the wheel brakes 38.

The motor vehicle 10 further comprises a non-driven second axle 24 with wheels 28, 29, on each of which a wheel brake 38 is arranged for braking the wheels 28, 29, which are also operatively connected to the anti-lock braking system 30.

The drivetrain 12 also comprises a control unit 60 for controlling the anti-lock braking system 30 and the torque-transmitting connection between the electric drive motor 16 and the driven wheels 26, 27. The control device 60 has a memory unit 62 and a processing unit 64. The memory unit 62 stores a computer program code 66 for executing a method according to the invention for controlling the drivetrain 12, which executes such a method when the computer program code 66 is executed by the processing unit 64.

Figure 2:
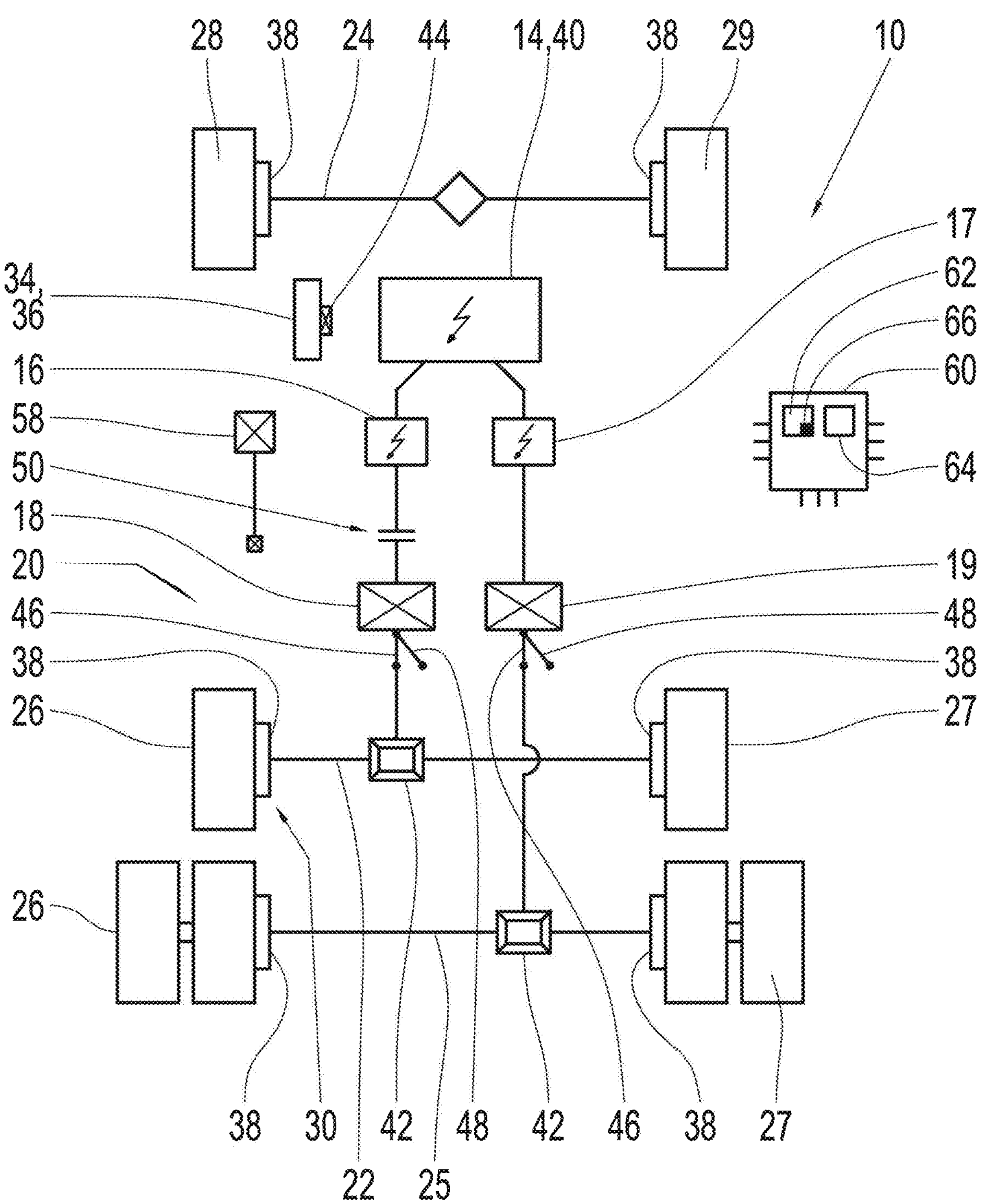
FIG. 2: another preferred exemplary embodiment of a drivetrain according to the invention for a motor vehicle.

FIG. 2 shows another preferred exemplary embodiment of such a drivetrain 12 for a motor vehicle 10. The drivetrain 12 comprises a power supply unit 14, which is designed as a high-voltage battery 40. Such a high-voltage battery 40 may be, in particular, but not exclusively, of the lithium-ion accumulator, lithium iron phosphate accumulator, solid electrolyte accumulator, or sodium-ion accumulator type.

With essentially the same structure as described in FIG. 1, the motor vehicle 10 in this exemplary embodiment has a drivetrain 12 with two electric drive motors 16, 17 and two driven axles 22, 25, each of the electric drive motors 16, 17 is connected to one of the driven axles 22, 25 via a gearbox 18.

Figure 3:
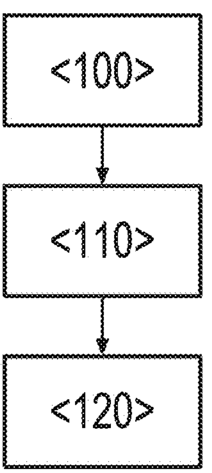
FIG. 3: a flow chart for carrying out a method according to the invention for controlling a drivetrain of a motor vehicle.

FIG. 3 shows a flow chart for carrying out a method according to the invention for controlling a drivetrain 12 of a motor vehicle 10 with an electric drive motor 16, 17, a wheel 26, 27 driven by the electric drive motor 16, 17, and an anti-lock braking system 30 for preventing the wheel 26, 27 from locking.

In a method step <100>, the anti-lock braking system 30 is monitored and an impending control intervention by the anti-lock braking system 30 is detected. Such an impending control intervention can be effected in particular by detecting a position of a brake actuating element 34, in particular a brake pedal 36, relative to a threshold value for a position of the brake actuating element 34 which is known to be associated with probable locking. As an alternative to an absolute position of the brake actuating element 34, an impending control intervention of the anti-lock braking system 30 can also be detected by detecting the change in the position of the brake actuating element 34, in particular by comparing a rate of change relative to a threshold value for such a rate of change, wherein a rate of change above the threshold value represents a typical reaction of a driver during emergency braking and an associated impending control intervention of the anti-lock braking system 30. If no value is available for a brake actuating element 34, an impending control intervention by the anti-lock braking system 30 can also be derived from an absolute brake pressure or a rate of change of the brake pressure. In a method step <110>, a torque-transmitting connection between the electric drive motor 16, 17 and a driven wheel 26, 27 of the drivetrain is interrupted when an impending or actual control intervention of the anti-lock braking system 30 is detected. This can be achieved in particular by shifting the gearbox 18 from a torque-transmitting first shift position 46 to a second, non-torque-transmitting neutral position 48. Alternatively, the torque-transmitting connection can also be interrupted by opening a clutch 50 in the drivetrain 12 between the electric drive motor 16, 17 and the wheels 26, 27. In a method step <120>, the brake pressure is then regulated as part of the control intervention, wherein the torque-transmitting connection between the electric drive motor 16, 17 and the wheel 26, 27 remains interrupted.

The invention is not limited to the exemplary embodiments described. The scope of protection is defined by the patent claims.

In principle, all methods described in the description or in the claims can be carried out by devices comprising means for carrying out the respective method steps of these methods.

REFERENCE NUMBERS

10 motor vehicle
12 drivetrain
14 power supply
16 electric drive motor
17 second electric drive motor
18 gearbox
19 second gearbox
20 braking system
22 first axle/drive axle
24 second axle
25 third axis/additional drive axle
26 first wheel
27 second wheel
28 third wheel
29 fourth wheel
30 anti-lock braking system
32 rotational speed sensor
34 brake actuating element
36 brake pedal
38 wheel brake
40 high-voltage battery
42 differential
44 brake actuator sensor
46 first gearbox shift position/torque-transmitting shift position
48 second gearbox shift position/neutral position
50 clutch
52 first drivetrain component
54 second drivetrain component
56 pneumatic activator
58 compressed air reservoir
60 control unit
62 memory unit
64 processing unit
66 computer program code

The invention claimed is:

1. A method for controlling a drivetrain of a motor vehicle with an electric drive motor, a wheel driven by the electric drive motor, an anti-lock braking system for preventing the wheel from locking, and a plurality of driven axles each being connected in a torque-transmitting manner via a gearbox to an electric drive motor, the method comprising:

detecting an impending control intervention of the anti-lock braking system;

disconnecting a torque-transmitting connection from the electric drive motor to the wheel in response to detecting the impending control intervention, wherein disconnecting the torque-transmitting connection includes shifting a gearbox located in the drivetrain between the electric drive motor and the driven wheel to a neutral position; and sequentially delaying a build-up of brake pressure at a driven axle of the drivetrain until the gearbox is transferred to the neutral position in order to prevent gearbox components and/or the drivetrain from becoming jammed.

2. The method according to claim 1, wherein detecting the impending control intervention of the anti-lock braking system includes detecting a position of a brake actuating element.

3. The method according to claim 2, wherein detecting the impending control intervention of the anti-lock braking system includes detecting a speed of change in the position of the brake actuating element.

4. The method according to claim 1, wherein detecting the impending control intervention of the anti-lock braking system includes detecting a speed at which brake pressure is built up and/or determining when a threshold value for the brake pressure is exceeded.

5. The method according to claim 1, wherein disconnecting the torque-transmitting connection includes opening a clutch arranged in the drivetrain between the electric drive motor and the driven wheel.

6. A control unit for controlling a drivetrain in the motor vehicle, wherein the control unit is configured to carry out the method according to claim 1, and wherein the control unit is in operative connection with the anti-lock braking system and with the torque-transmitting connection of the drivetrain.

7. A drivetrain for the motor vehicle, comprising:

the electric drive motor;

the driven wheel;

the torque-transmitting connection between the electric drive motor and the driven wheel;

the anti-lock braking system; and a control unit for controlling the drivetrain and configured to carry out the method according to claim 1, wherein the control unit is in operative connection with the anti-lock braking system and with the torque-transmitting connection of the drivetrain.

8. The drivetrain according to claim 7, wherein the anti-lock braking system is pneumatically operated.

9. A motor vehicle with the drivetrain comprising:

the electric drive motor;

the driven wheel;

the torque-transmitting connection between the electric drive motor and the driven wheel;

the anti-lock braking system; and a control unit for controlling the drivetrain and configured to carry out the method according to claim 1, wherein the control unit is in operative connection with the anti-lock braking system and with the torque-transmitting connection of the drivetrain.

10. The motor vehicle according to claim 9, comprising multiple drive axles.

11. A non-transitory computer-readable medium comprising executable code that, when executed by a computer, carries out the method according to claim 1.

* * * * *